Figure 1:
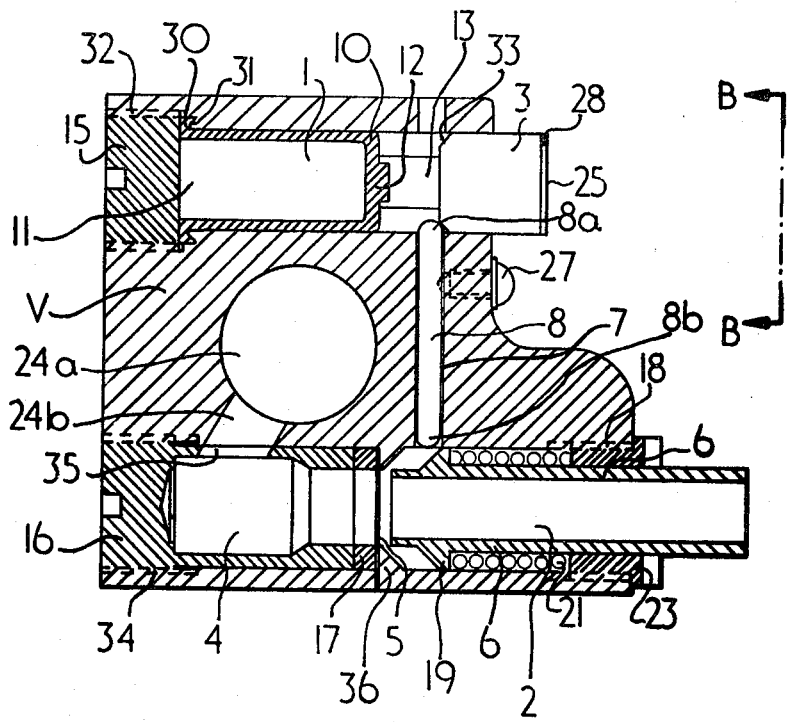

United States Patent [19]

Major

[11] 3,920,032
[45] Nov. 18, 1975

[54] FLUID RELEASE VALVE

[75] Inventor: Douglas James Major, Sutton Coldfield, England

[73] Assignee: Dunlop Limited, London, England

[22] Filed: Aug. 17, 1973

[21] Appl. No.: 389,208

[30] Foreign Application Priority Data
Aug. 22, 1972 United Kingdom............... 39061/72

[52] U.S. Cl................ 137/68; 137/81; 152/330 L; 152/330 RF; 152/415; 222/5; 251/73
[51] Int. Cl.²..................... B60C 17/00; B67B 7/24
[58] Field of Search........ 152/330 L, 415, 418, 419; 137/68, 81; 222/5; 9/314, 316; 251/73

[56] References Cited
UNITED STATES PATENTS

| | | |
|---|---|---|
| 2,410,310 | 10/1946 | Smith.................................. 222/5 X |
| 2,697,538 | 12/1954 | Seeler............................... 137/68 X |
| 3,126,128 | 3/1964 | Borsack et al..................... 137/81 X |
| 3,526,339 | 9/1970 | Bernhardt et al....................... 222/5 |
| 3,850,220 | 11/1974 | Mitchell....................... 152/330 L X |

FOREIGN PATENTS OR APPLICATIONS

| | | |
|---|---|---|
| 2,044,512 | 2/1971 | France................................. 137/68 |

Primary Examiner—Martin P. Schwadron
Assistant Examiner—Richard Gerard
Attorney, Agent, or Firm—Stevens, Davis, Miller & Mosher

[57] ABSTRACT

A fluid release valve, particularly for the release of fluid lubricant within a tire on reduction of inflation pressure comprising a membrane preventing fluid release and capable of being ruptured by a plunger. A latch normally retains the plunger but releases the plunger to rupture the membrane when acted upon by a pressure responsive device.

12 Claims, 2 Drawing Figures

U.S. Patent  Nov. 18, 1975  3,920,032

FLUID RELEASE VALVE

This invention relates to a fluid release valve. In particular the invention relates to the use of such a valve in combination with a tire and wheel assembly.

In the event of a puncture or deflation of a pneumatic tire, the profile of the tire changes and the interior surfaces of the tire come into contact with one another. If a tire and wheel assembly is used with the tire in a deflated condition the interior surfaces rub against each other causing the generation of frictional heat. This heat may cause the tire fabric to become damaged and the tire is rendered useless.

It has been proposed in U.S. Pat. No. 3,739,829 to use a lubricant fluid to cover the interior surfaces of the tire thereby reducing the frictional heat generated and it is an object of this invention to provide a valve capable of releasing a fluid when the inflation pressure of the tire falls to a low value.

According to the invention, a fluid release valve comprises a rupturable membrane which prevents release of fluid, a plunger spring-urged towards a position in which it will cause rupture of the membrane, a plunger-retaining latch, and a pressure-responsive device arranged to move the latch from a plunger-retaining position to a plunger-releasing position when the ambient pressure falls below a predetermined value.

The pressure responsive device may comprise a closed chamber containing a gas or vapor, the volume of the gas or vapor increasing when the ambient pressure falls to cause movement of the latch. In one example of the invention the pressure of the gas or vapor retained within an expansible member, e.g., a rubber sleeve, acts on one side of a piston and the ambient, e.g., inflationary air, in the case of a pneumatic tire, pressure acts on the other so that on fall of ambient pressure the piston moves to cause movement of the latch.

The fluid may be enclosed in a container within the body of the valve.

The valve may be positioned in the well of a wheel rim.

Figure 2:
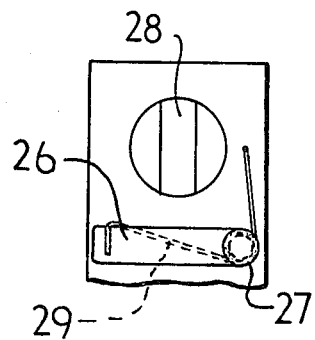

One embodiment of the invention will now be described by way of example only with reference to the accompanying drawings in which:

FIG. 1 is a cross-sectional view of the valve and
FIG. 2 is an end view of the top half of the valve viewed in the direction of the arrows B—B.

A fluid release valve for use within a tire and wheel assembly comprises two generally cylindrical chambers 1 and 2 arranged with their axes parallel and connected by a bore 7 extending perpendicularly between the chambers within a valve body V.

The first chamber 1 is positioned in the top of the valve body and accommodates a piston 3 and a rubber sleeve 10 of cylindrical cross-section. The sleeve 10 is provided with an open end 11 and a closed end 12, the latter being bonded to a portion 13 of the piston 3 of reduced cross-section. The open end of the sleeve is formed with an exterior flange 30 of triangular cross-section which seats in a correspondingly shaped annular recessed shoulder 31 formed in the wall of chamber 1. The sleeve is retained in position by means of a screw-threaded plug 15 engaging in a screw-threaded end portion 32 of the chamber, the plug being tightened against the flange 30 of the sleeve 10.

The portion 13 of reduced cross-section of the piston 3 extends for about one third of the length of the piston, a tapered shoulder 33 being provided at the junction of the portion 13 with the remainder of the piston 3. The function of this tapered shoulder will be described later.

The second chamber 2 is positioned in the bottom of the valve body and is provided at one end with a screw-threaded portion 34. A screw-threaded plug 16 provided with an internal bore to form a fluid-enclosing chamber 4 can be screwed into the portion 34 to seal the chamber 2. The fluid, in this embodiment, a lubricant as disclosed in the aforementioned U.S. Pat. No. 3,739,829 is retained by means of a rupturable disc-shaped membrane 5 of aluminium foil or thin rubber or plastic sheet located against an annular abutment 36 formed on the wall of the second chamber 2 by a collar 17. When the plug 16 is screwed into position the edge of the membrane 5 is gripped between the collar 17 and the abutment 36 to provide a fluid-tight seal. The collar 17 and membrane 5 may be bonded together e.g. when both are of aluminium or aluminium alloy, or may be integrally formed e.g. moulded as a single unit from mouldable plastics material or rubber. An aperture 35 is provided in the side of the plug 16 to connect the chamber 4 via passages 24a and 24b to a fluid reservoir (not shown).

The second chamber 2 also contains a spring-loaded plunger 6 in the form of a cylindrical tube 18 having an external shoulder 19, which is a sliding fit in chamber 2. The side of the shoulder 19 nearer the membrane 5 is tapered for a reason which will be apparent from the later description. A coil spring 21 is positioned in compression against the side 22 of the shoulder 19 further from the membrane 5 and extends around the plunger 6 and axially along the chamber. A threaded collar 23 which screws into a threaded portion 18 of the chamber 2 and fits over the plunger 6 retains the coil spring 21 in position to urge the plunger 6 towards the membrane 5.

The bore 7 connecting the two chambers 1 and 2 enclose a cylindrical shaft 8 having rounded ends 8a and 8b. The end 8a of the shaft nearer the first chamber 1 engages the tapered shoulder 33 or the side of the piston 3 depending on the positions of the shaft in bore 7 and the piston 3 in the first chamber 1. The end 8b of the shaft nearer the second chamber 2 abuts the side of the plunger 6 or the tapered side of shoulder 19 depending on the positions of the shaft and the plunger.

The fluid release valve is attached to the well of a vehicle wheel rim normally by being mounted on a reservoir of lubricant (not shown) which extends around the base of the rim, the lubricant entering the valve through apertures 24a and 24b in the valve body. The valve may alternatively be provided with a reservoir positioned within the body of the valve.

To operate the valve the piston 3 of chamber 1 is normally pushed into the chamber until the outer face 25 of the piston 3 is flush with the wall of the valve body. This compresses the air inside the sleeve 10 to a pressure approximating the inflation pressure of the tire. The outer face 25 of the piston 3 is provided with a groove 28 to accommodate a lever 26 which pivots against a spring 29 about a screw 27 screwed into a threaded hole in the valve body. The spring-loaded lever 26 is then rotated about the screw 27 to a position where it is located over the piston 3 where it is held in position by the groove 28 in the outer face 25 of the piston 3, thereby holding the piston 3 in position. When the piston 3 is in this position the top end 8a of the vertical shaft 8 abuts the side of piston 3 and is pressed down so that the bottom end 8b of the shaft 8 protrudes into chamber 2 abutting the shoulder 19 and the plunger 6, to act as a stop, preventing the plunger 6 from being moved towards the membrane 5 by the spring 21. The valve is now in its loaded position.

The tire is then fitted to the wheel and inflated to a pressure in excess of its normal inflation pressure. This causes the piston 3 to be pushed further into chamber 1 compressing the rubber bag 10 and allowing the spring-loaded lever 26 (see FIG. 2) to be released from the groove 28 in the outer face 25 of the piston 3 and to spring back in an unlocked position as shown in view BB. The tire is then deflated to its normal inflation pressure which balances the pressure within the rubber sleeve 10 and allows the piston 3 to move slightly out of the chamber 1 to a balanced position.

In the event of a puncture or deflation of the tire the reduction in pressure outside the valve allows the pressure in the rubber sleeve 10 to push the piston 3 out of the chamber 1 until the portion of reduced cross-section 13 of the piston 3 is vertically above the shaft 8. The shaft 8 is then pushed vertically upwards by the tapered side of the shoulder 19 on the plunger 6 abutting the rounded lower end 8b of the shaft 8. Once the end 8b of the shaft 8 is radially outwards of the shoulder 19 the plunger 6 is free to travel under the influence of the coil spring 21 into engagement with the membrane 5. The diaphragm 5 is ruptured and the lubricating fluid is released, escaping through the central hole in the plunger 6, out of chamber 2 and into the inflation chamber of the tire, where it is dispersed by rotational action of the wheel.

The detailed design features of the valve depend on the manufacturing capacity and cost limitations. For mass production the valve body and most components could be constructed from plastics by an injection moulding process.

1. A fluid release valve comprising a rupturable membrane which prevents release of fluid, a plunger spring-urged towards a position in which it will cause rupture of the membrane, a plunger-retaining latch, and an ambient pressure responsive device arranged to move the latch from a plunger-retaining position to a plunger-releasing position when the ambient pressure falls below a predetermined value, said pressure responsive device comprising a piston acting on a closed chamber containing a gas or vapor, the pressure of the gas or vapor acting on one side of the piston and the ambient pressure on the other side whereby on fall of ambient pressure the piston moves to cause movement of the latch.

2. A fluid release valve according to claim 1 including an expansible member enclosing the gas or vapor.

3. A fluid release valve according to claim 2 wherein the expansible member comprises a rubber sleeve.

4. A fluid release valve according to claim 1 wherein a tapered shoulder is provided on the plunger and the latch comprises a movable shaft, one end of which shaft abuts the piston and the other end of which shaft abuts the tapered shoulder, movement of the piston on fall of ambient pressure causing movement of the shaft in the plunger-releasing position under the influence of the spring-urged plunger.

5. A fluid release valve according to claim 4 comprising a bore within which the shaft is slidably movable and wherein the piston is provided with a portion of reduced cross-section, movement of the piston on fall of ambient pressure causing the portion of reduced cross-section to move into a position where the shaft no longer abuts the piston to allow the shaft to be moved to the plunger-releasing position.

6. A fluid release valve according to claim 1 comprising prevention means for preventing the pressure responsive device from moving the latch.

7. A fluid release valve according to claim 6 wherein the said prevention means is rendered inoperable by increasing the ambient pressure above a predetermined value.

8. A fluid release valve according to claim 1 comprising piston-holding means for holding the piston in a position whereby movement of the latch to the plunger releasing position is prevented.

9. A fluid release valve according to claim 8 wherein the piston-holding means comprises a lever spring-biased out of a piston-holding position by pressure of the gas or vapor acting on the piston.

10. A fluid release valve according to claim 9 wherein the piston is provided with a lever-seating groove in which the lever seats in the piston-holding position.

11. A fluid release valve according to claim 1 wherein the plunger is tubular, allowing fluid to flow therethrough to the exterior of the valve after rupture of the membrane.

12. A fluid release valve according to claim 11 wherein the pressure responsive device comprises an expansible member enclosing a gas or vapor, the volume of the gas or vapor increasing when the ambient pressure falls causing movement of the latch.

* * * * *